Figure 1:
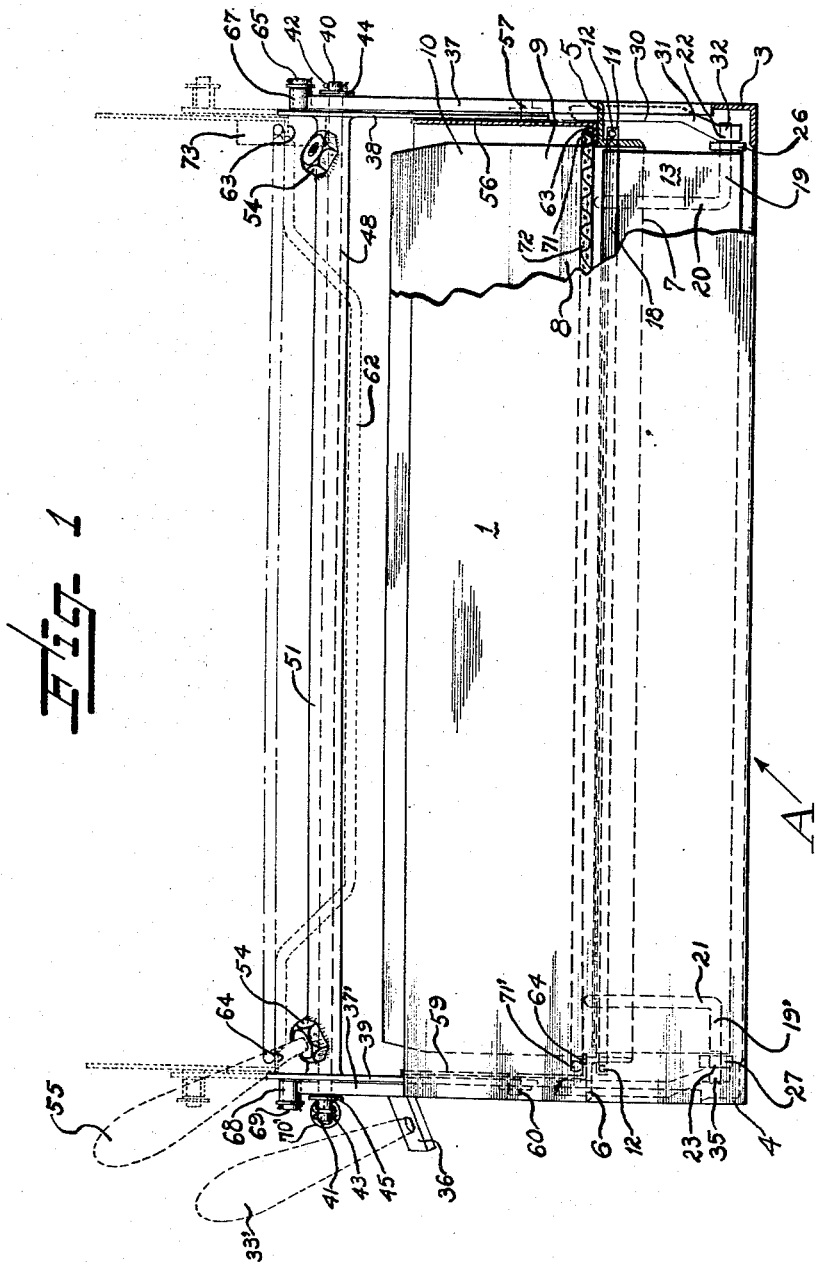

Jan. 9, 1951 T. B. BRICKSON 2,537,204
DOUGHNUT TURNER
Filed May 29, 1946 4 Sheets-Sheet 1

INVENTOR.
THOMAS B. BRICKSON
BY
R. S. Berry

Jan. 9, 1951 T. B. BRICKSON 2,537,204
DOUGHNUT TURNER
Filed May 29, 1946 4 Sheets-Sheet 2

INVENTOR.
THOMAS B. BRICKSON
BY

Jan. 9, 1951　　　　　T. B. BRICKSON　　　　2,537,204
DOUGHNUT TURNER
Filed May 29, 1946　　　　　　　　　　　　　4 Sheets-Sheet 3

Inventor
THOMAS B. BRICKSON
By R. S. Berry
Attorney

Jan. 9, 1951 T. B. BRICKSON 2,537,204
DOUGHNUT TURNER
Filed May 29, 1946 4 Sheets-Sheet 4
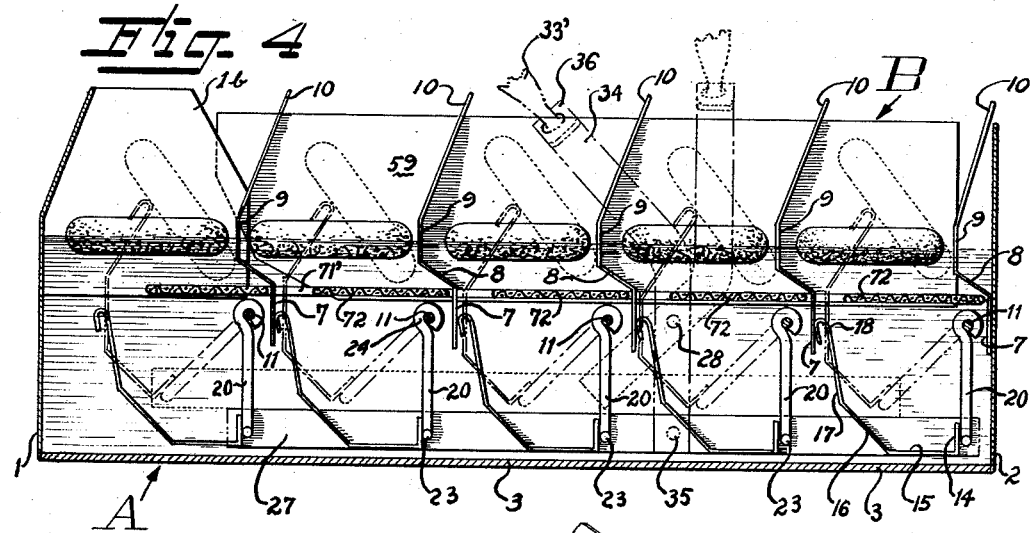
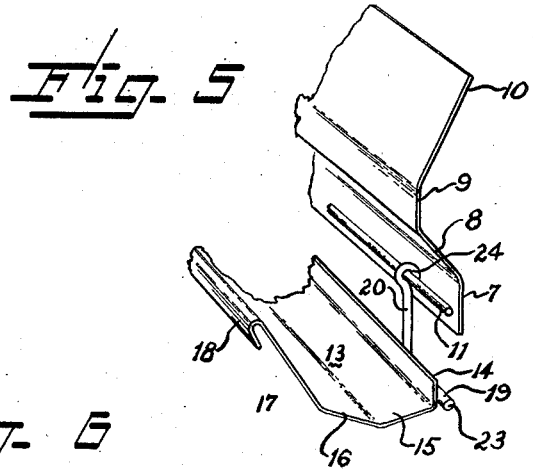
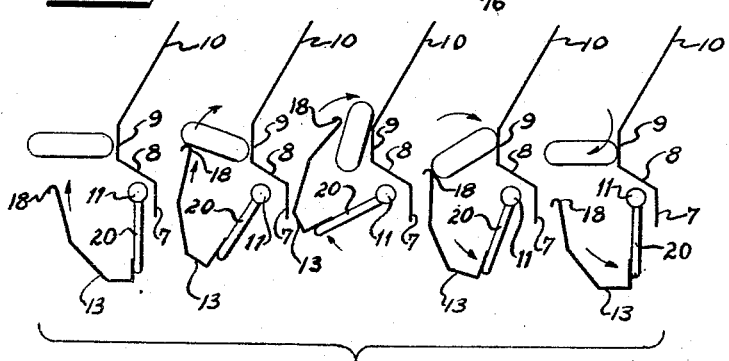
Inventor
THOMAS B. BRICKSON
By R. S. Berry
Attorney Patented Jan. 9, 1951

2,537,204

UNITED STATES PATENT OFFICE 2,537,204

DOUGHNUT TURNER

Thomas B. Brickson, Los Angeles, Calif., assignor, by mesne assignments, to Doughnut Corporation of America, New York, N. Y., a corporation of New York Application May 29, 1946, Serial No. 672,998

6 Claims. (Cl. 99—409)

This invention relates to machines for facilitating the making of doughnuts, crullers, and other edible products which are cooked while floating on a body of hot lard or other cooking oil and particularly to a machine useful in bakeries and the like in which such products are prepared in large quantities.

An important object of the invention is to provide a device for the purpose above mentioned which is so constructed that a large quantity of the particular product can be simultaneously cooked, turned, removed and new uncooked blanks be subjected to cooking with a minimum loss of time whereby a given area of cooking medium is substantially constantly utilized to the greatest extent resulting in increased output.

Another object of the invention is to provide a device of the above character wherein a large quantity of blanks of doughnuts, crullers or the like can be dropped into the cooking oil in a predetermined spaced relation which relation is thereafter maintained during the entire cooking operation.

Still another object of the invention is the provision in a device of the above character of means for simultaneously turning a quantity of doughnuts, or other products being cooked whereby uniformity in the time of cooking of said quantity is achieved.

A still further object of the invention is the provision in a device of the above character of means constructed and arranged to remove a quantity of doughnuts simultaneously from the surface of the cooking medium and subsequently to simultaneously deposit a quantity of uncooked blanks on the surface of the cooking medium which means is adapted to permit the free operation of the devices for turning the doughnuts or other products being cooked.

Still another object of the invention is to provide in a device of the above character, a raising or lowering means for a quantity of doughnuts which means is so constructed and arranged as to permit the ready reception and removal of trays on which the products to be cooked are deposited and from which the cooked products are removed.

A still further object of the invention is the provision in a device of the above character of means to receive and manipulate a series of trays to be used in connection with the turning devices which trays are so constructed and arranged as to permit the turning devices to operate and to permit the free circulation of the cooking oil.

A still further object of the invention is to provide a device of the above character which is of light weight which is easy to clean and which is simple and economical to construct and to maintain in operative condition.

Figure 2:
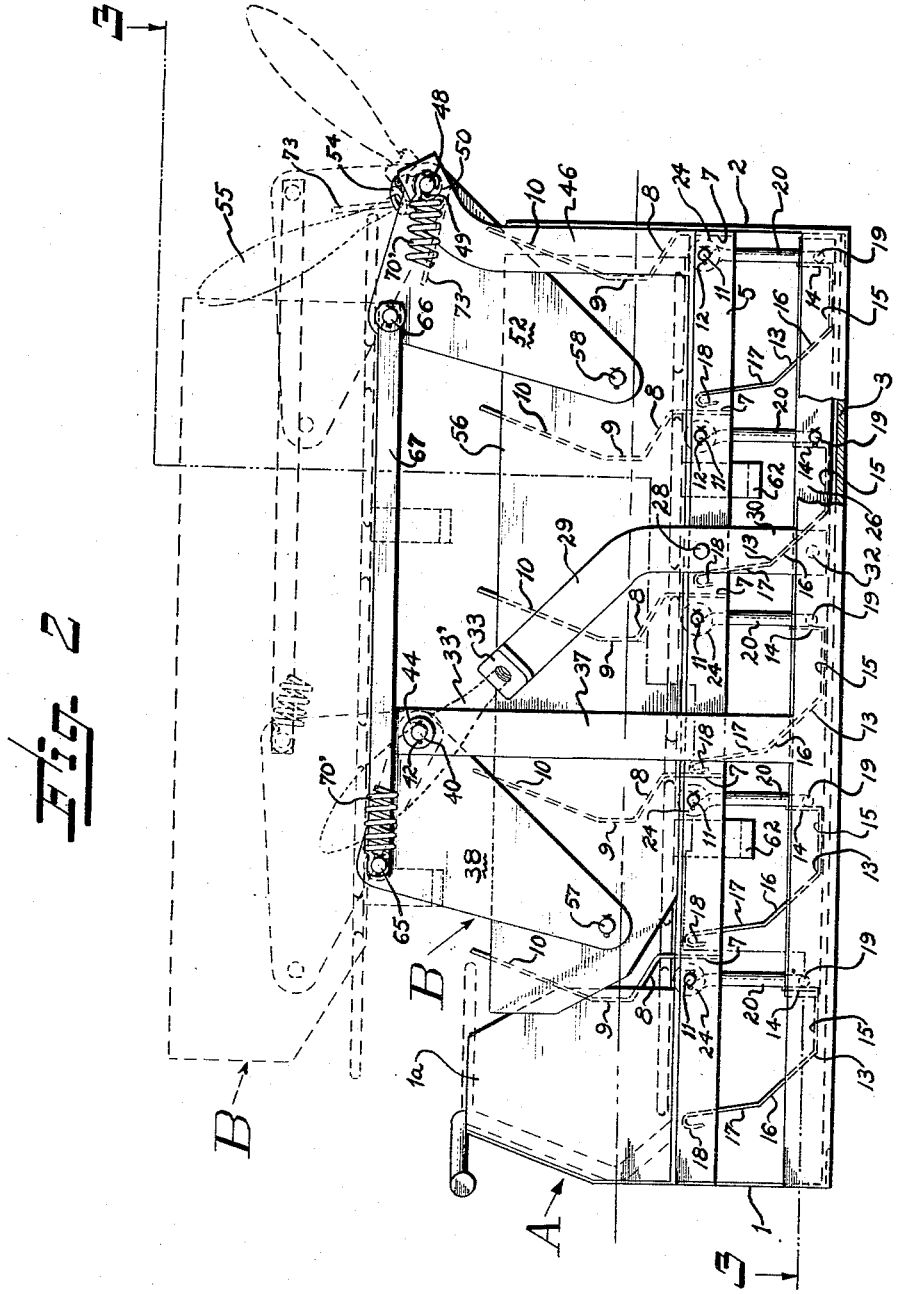
Figure 3:
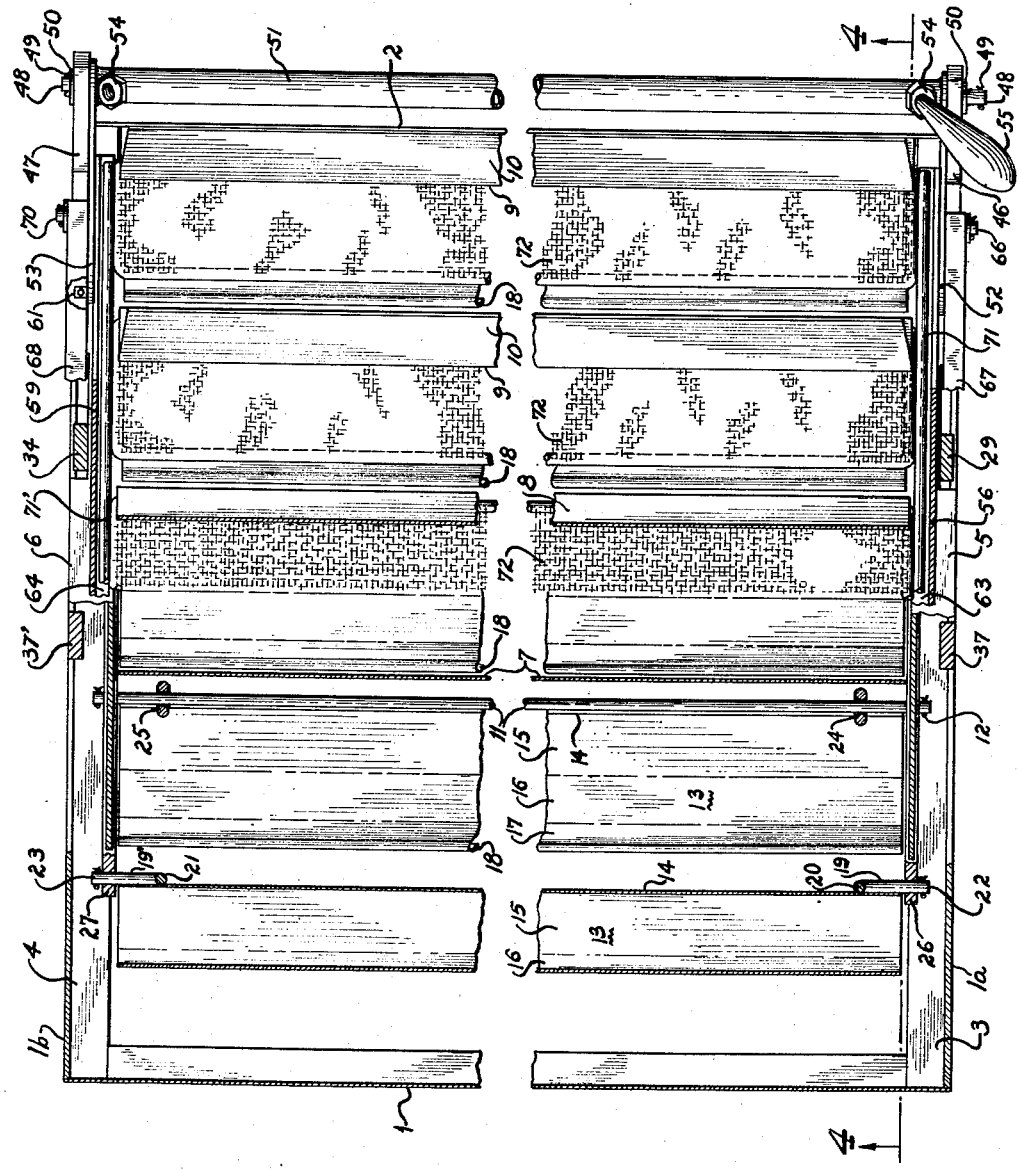

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a front end elevation of one embodiment of the invention, portions of the structure being broken away for clearness of illustration, Fig. 2 is a side elevation of the form shown in Fig. 1 and showing additionally in dotted lines the movement of that portion of the apparatus which deposits the uncooked articles in the cooking oil and removes them therefrom, Fig. 3 is a top plan view taken on the staggered line 3—3 of Fig. 2, the center portion of the device being broken out to permit the use of a large scale of drawing for clearness of illustration, Fig. 4 is a sectional side elevation taken on the line 4—4 of Fig. 3, Fig. 5 is a fragmentary perspective view of one of the turning elements, its mounting means and associated deflector plate, and Fig. 6 is a diagrammatic illustration of the progressive steps in turning a doughnut by means of this invention.

Generally considered, the device embodies a frame structure A which is designed to be positioned in a kettle containing heated oil, together with rack raising and lowering mechanism B on the frame structure for positioning articles to be cooked on the surface of the oil and removing them therefrom, and means carried by the frame structure for effecting turning over of the articles floating on the oil including upright stationary deflector plates arranged for partial submergence in the oil and associated moveable turning elements arranged for positioning beneath the articles floating on the oil.

The frame structure A comprises a front end member 1 and a rear end member 2 formed of sheet metal and connected at their side edges by a lower pair of angle iron members 3 and 4 and an upper pair of angle iron members 5 and 6 constituting the side members of the frame structure. The members 3 and 4 have the lower legs thereof disposed horizontally with the edge portions disposed inwardly while the upper legs are disposed vertically substantially flush with the side edges of the end members. The members 5 and 6 have the upper leg portions disposed horizontally with the free edges thereof substantially flush with the side edges of the end members and with the depending, vertically disposed lower leg members located inwardly from the side edges of the end members 1 and 2. The front end member 1 extends above the upper side members 5 and 6 and has its upper portion inclined rearwardly and provided with rearwardly extending side flange members 1a and 1b forming a wall extending across the front and a short distance along the sides of the frame structure arranged to project above the surface of the oil to confine articles floating on the oil adjacent the inside of the front end member.

Extending between the vertically disposed faces of members 5 and 6 at spaced intervals are the vertically disposed lower portions of a series of fixed deflector plates 7 which plates above the level of the members 5 and 6 first extend vertically a short distance then are inclined upwardly and forwardly at an acute angle from the horizontal as at 8, thence extending vertically upward as at 9 for a short a distance and thence extend upwardly and rearwardly at an acute angle to the vertical for a considerable distance as at 10. The function of these faces will be described in connection with the operation of the apparatus.

Extending transversely of the frame structure and mounted in the vertically disposed legs of the members 5 and 6 slightly in front of the lower portions of the deflector plates is a series of shafts 11, one for each deflector plate. The shafts are held against endwise movement by any suitable means such as cotter pins 12 extending through the ends of the shafts exteriorly of the members 5 and 6.

Mounted for oscillation on each of said shafts is a turning element 13 comprising a sheet metal element extending transversely of the frame structure between the opposed vertical faces of the members 5 and 6 and comprising in its normal position, a short vertically disposed rear wall 14, a substantially horizontal portion 15 extending forwardly from the lower side of the wall 14, a forwardly extending upwardly inclined wall portion 16 disposed at an obtuse angle to the horizontal, and a second forwardly and upwardly inclined wall portion 17 disposed at a greater obtuse angle to the horizontal and terminating in a rebent lip portion 18. Attached by any suitable means such as welding to the vertical wall portion 14 of each turning element 13 are the horizontally disposed end portions 19 and 19' of hanger elements 20 and 21 the free ends 22 and 23 of which project slightly beyond the edges of the turning element. The inner ends of the hanger elements extend vertically and at their upper ends are formed into eyelets 24 and 25 through which the shafts 11 extend. Extending along one side of the frame structure between the lower member 3 and the adjacent ends of the turning members is a side rod 26 provided with a series of apertures in which the projecting ends 22 of the adjacent hanger elements 20 are journalled. A similar side rod 27 engages the ends 23 of the hanger elements 21 at the opposite side of the frame structure. Pivotally mounted in the members 5 and 6 is a shaft 28 to one end of which, exteriorly of the member 5, a lever 29 is fixed by any suitable means such as welding. The lever has a depending portion 30 which near the lower end is offset inwardly as at 31 to lie closely adjacent to the outer face of the side rod 26 to which it is pivotally connected by a pin 32. The upper end of the lever 29 is upwardly, forwardly and outwardly inclined and terminates in a handle supporting portion 33 to which a handle 33' may be attached.

The other end of the shaft 28 projects beyond the member 6 and has fixed thereto a lever 34 which at its lower end is attached by a pivot pin 35 to the side bar 27 and this lever at its upper end also is inclined upwardly, forwardly and outwardly, terminating in a handle supporting portion 36 to which if desired, the handle 33' may be applied depending on which side of the apparatus is to be accessible for operation in a particular installation.

Disposed at opposite sides of the frame structure and attached to the side members 3 and 5 and 4 and 6 respectively by suitable means such as welding or brazing is a pair of upstanding bracket members 37 and 37' to the upper ends of which one end each of a pair of arm members 38 and 39 are pivoted by means of pivot pins 40 and 41 fixed to the arm members 38 and 39 respectively. Cotter pins 42 and 43 extending through the pivot pins and washers 44 and 45 underlying the cotter pins serve to hold the arm members 38 and 39 in assembly. At the rear end of the frame structure and disposed at either side thereof is a pair of upstanding members 46 and 47 attached by brazing or welding respectively to the members. The members 46 and 47 at their upper ends are inclined rearwardly and are provided with aligned apertures through which a fulcrum pin 48 extends and is secured against endwise movement by cotter pins 49 and washers 50 exteriorly of the members 46 and 47. Freely mounted on the fulcrum pin 48 and extending between the opposite faces of the members 46 and 47 is a sleeve 51 to the opposite ends of which are rigidly secured a pair of radially projecting arms 52 and 53. Near each end thereof, the sleeve 51 is provided with internally threaded bosses 54, 54 to either of which a handle 55 may be attached.

Pivotally connected to the free ends of the arms 38, 39, 52 and 53 is a rack manipulating frame comprising a side member 56 having laterally projecting pins 57 and 58 pivotally engaging the free ends of the arms 38 and 52, an oppositely disposed side member 59 having laterally projecting pins 60 and 61 pivotally engaging the free ends of the arms 39 and 53, the two side members being interconnected by a series of cross members 62 welded or brazed to the inturned flange portions 63 and 64 of the side members. Additionally the arms 38 and 52 are respectively provided with laterally projecting pins 65 and 66 which pins are pivotally engaged by a lazy bar 67 and a lazy bar 68 pivotally engaging pivots pins 69 and 70 carried by the arms 39 and 53 serves to interconnect said arms in the same manner. It will be seen that upon oscillation of the sleeve 51 the rack manipulating frame will be given a parallel rule motion about the axes of the fulcrum pin 48 and the aligned axes of the pivot pins 40 and 41. Preferably, the tension spring 70' is attached at one end to the projecting end of the fulcrum pin 48 and at its other end to the forward arm (38 or 39) at the point of connection therewith of the lazy bar. This spring can be mounted on either side as the installation of the apparatus makes desirable. It will be noted that in this position, the spring 70' acts as an over-center spring operating to hold the rack manipulating frame either in its raised position determined by the engagement of the pins 58 and 61 with the under faces of the lazy bars 67 and 68 or in its lower position determined by engagement of the flange members 63 and 64 with the upper faces of the members 5 and 6 respectively.

The upper faces of the flange members 63 and 64 are adapted to receive and support a rack comprising spaced side members 71 and 71' having secured therebetween at spaced intervals, a series of transverse strips of heavy screen 72, the intervals between adjacent strips providing clearance for the entrance of the deflecting members incident to the lowering of the rack manipulating frame and a rack carried thereby in the manner described above. The proper longitudinal position of the rack is determined by a laterally projecting flange member 73 carried by the arm member 52.

In use, the apparatus is placed in a kettle containing heated cooking oil and is disposed so that the level of the oil is approximately halfway up the vertical portions 9 of the deflector plates 7. The rack manipulating frame is moved to its upper position and a rack having a series of doughnut blanks placed on the screen portions 72 is placed on the inturned flanges 63 and 64 by sliding it in endwise from the front end until it comes in contact with the flange member 73. Preferably the front ends of the side members 56 and 59 are flared outwardly slightly to guide the leading edge of the rack into position. The rack manipulating frame is then lowered carrying the rack with it, the upper ends 10 of the deflecting plates entering the intervals between the screen strips comprising the rack. When the frame has reached its lowest position the blanks will be floating on the oil and the rack will be out of contact therewith. When the cooking operation on one side has been completed, the operator moves the lever connected with the turning apparatus to turn the partly cooked doughnuts over.

In Fig. 6 there is illustrated diagrammatically the successive steps by which this operation is accomplished. In the first position the parts are shown in the position occupied at the beginning of the turning operation. As the turning element 13 is moved clockwise, as viewed in this figure, the lip portion 18 thereof will engage the side of the doughnut remote from the deflector plate and start to lift it, the opposite side of the doughnut remaining floating in the oil. Then, continued movement of the turner will lift the engaged side of the doughnut until it is past a vertical position upon which it will fall against the deflector plate and will be permitted to slide down the face thereof until it is permitted to float in its inverted position on completion of the return movement of the turner. When the cooking operation is completed, the rack manipulating frame is raised to its upper position, the rack containing the cooked doughnuts is removed and a fresh rack placed thereon. It will be noted that through the connection of the turning elements by the side bars all of the doughnuts in a rack load will be turned simultaneously. Further, since the bottom and sides of the apparatus are completely open a free circulation of the cooking oil is permitted thus maintaining a uniform cooking temperature.

Thus there has been provided an apparatus for cooking doughnuts characterized by simple, sturdy construction, which in all parts is accessible for cleaning and which is capable of a high rate of production of doughnuts of uniform quality. It will be understood that while in the foregoing specification the term "doughnut" has been used it is not intended that the usefulness of the device shall be so limited and that principles of construction and mode of operation may be used with equal advantage for the cooking of other food products.

While I have shown and described a specific embodiment of my invention, I do not limit myself to the exact details of construction set forth, and the invention embraces such changes, modifications and equivalents of the parts and their formation and arrangement as come within the purview of the appended claims.

I claim:

1. In an apparatus for cooking doughnuts, the combination of a frame structure immersible in a bath of cooking oil and having a series of fixed spaced transverse partitions extending from a point below to a point above the normal level of cooking oil in which the apparatus is immersed, said partitions defining a series of parallel cooking zones, means for lowering and raising a series of doughnuts into and out of the cooking oil in said zones comprising a rack supporting device having a parallel rule movement, a rack carried by said supporting device provided with a series of spaced openings adapted to be entered by said partitions incident to the lowering of said device and rack, a separate turning element in each of said zones and operable through an opening in said rack to engage and turn doughnuts in said zone and means for interconnecting said turning devices for simultaneous operation.

2. In a doughnut cooking apparatus adapted to be immersed in a body of cooking oil, the combination of a frame structure comprising a pair of end members, a pair of side members disposed one above the other at each side of said frame structure and connected to each of said end members, means supported by said frame structure for raising and lowering a batch of doughnuts into the cooking oil, fixed transverse partitions on said frame structure for maintaining the doughnuts in a predetermined relation to one another and doughnut turning means carried by said frame structure for simultaneously engaging all of the doughnuts in one batch and turn them over; said turning means including a lip for abutment with the underside of a marginal portion of a doughnut to tilt it upwardly and rearwardly on the cooking oil.

3. In a doughnut turner, a frame structure for immersion in hot cooking oil, spaced fixed deflector plates carried by said frame structure having inclined upper portions extending above the oil level and having lower portions extending below the oil level, vertically moveable oscillatory doughnut turning elements adjacent the lower portions of said plates embodying forwardly and upwardly inclined wall portions, doughnut engaging lips on the outer margins of said wall portions, and means for swinging said elements; said elements being moveable to tilt doughnuts floating on the oil backwardly against the upper portions of said deflector plates and being moveable to release the doughnuts and allow them to slide from the deflector plates onto the oil in an inverted position.

4. In a doughnut turner, a frame structure, a fixed deflector plate having an upwardly extending portion, a vertically moveable oscillatory doughnut turning element adjacent the lower portion of said plate having a doughnut engaging lip, and means for swinging said element; said lip being engageable with the underside of a doughnut on upward movement of the element and moveable on a path that will tilt the doughnut upwardly and rearwardly against the deflector plate and being moveable downwardly to release the doughnut; said deflector plate directing the released doughnut downwardly in an inverted position.

5. In a doughnut turner, a frame structure, a deflector plate fixed on said frame structure having an upwardly extending portion, a rock shaft adjacent the lower portion of said plate, hangers on said rock shaft, a doughnut turning element on said hanger including a horizontal portion leading from the hangers, and an upwardly extending portion, a doughnut engaging lip on said upwardly extending portion arranged to abut the underside of the marginal portions of doughnuts floating on a liquid in which said turning element is submerged, said lip being moveable upward on turning said rock shaft in one direction to upend doughnuts engaged thereby against said deflector plate; said plate being arranged in the path of doughnuts upended by said turner to deflect the doughnuts edgewise into the liquid into an inverted position.

6. The structure called for in claim 5 together with a rack support pivoted to said frame for vertical parallel rule movement, a doughnut carrying rack on said support; said rack support being positionable in said frame to dispose said rack adjacent said rock-shaft, said rack having an opening to receive said partition and through which the lipped end of said turner extends on upward movement thereof.

THOMAS B. BRICKSON.

REFERENCES CITED

The following references are of record in the file of this patent:

UNITED STATES PATENTS

| Number | Name | Date |
| --- | --- | --- |
| 2,189,200 | Dusterdick | Feb. 6, 1940 |
| 2,199,266 | Maier | Apr. 30, 1940 |
| 2,202,602 | Ruch | May 28, 1940 |
| 2,334,650 | Ruch | Nov. 16, 1943 |
| 2,450,962 | Hornkohl et al. | Oct. 12, 1948 |